United States Patent
Van Hattum

(10) Patent No.: US 10,571,325 B2
(45) Date of Patent: Feb. 25, 2020

(54) ULTRASONIC FLOW METER

(71) Applicant: Berkin B.V., Ruurlo (NL)

(72) Inventor: Eduard Dieter Van Hattum, Ruurlo (NL)

(73) Assignee: BERKIN B.V., Ruurlo (NL)

( * ) Notice: Subject to any disclaimer, the term of this patent is extended or adjusted under 35 U.S.C. 154(b) by 32 days.

(21) Appl. No.: 15/766,295

(22) PCT Filed: Oct. 10, 2016

(86) PCT No.: PCT/NL2016/050702
§ 371 (c)(1),
(2) Date: Apr. 5, 2018

(87) PCT Pub. No.: WO2017/061870
PCT Pub. Date: Apr. 13, 2017

(65) Prior Publication Data
US 2018/0306627 A1    Oct. 25, 2018

(30) Foreign Application Priority Data
Oct. 9, 2015   (NL) ...................................... 2015591

(51) Int. Cl.
*G01F 15/14*   (2006.01)
*G01F 1/66*    (2006.01)
*G10K 11/00*   (2006.01)

(52) U.S. Cl.
CPC .............. *G01F 15/14* (2013.01); *G01F 1/667* (2013.01); *G10K 11/004* (2013.01)

(58) Field of Classification Search
CPC .. G01F 1/66; G01F 1/32; G01F 15/14; G01N 29/02
See application file for complete search history.

(56) References Cited

U.S. PATENT DOCUMENTS 3,751,979 A    8/1973   Ims
6,055,868 A    5/2000   Koyano et al.
(Continued)

FOREIGN PATENT DOCUMENTS

GB          2089617         6/1982
JP          2006-030142     2/2006
WO      WO 2015/150801      10/2015

*Primary Examiner* — Jewel V Dowtin
(74) *Attorney, Agent, or Firm* — Casimir Jones; Tanya Arenson

(57) ABSTRACT

The invention relates to an ultrasonic flow measurement system comprising a flow tube for the fluid whose flow rate is to be determined and at least two ultrasound transducer circuitry. At least one of the at least two ultrasound transducer circuitry comprises an ultrasound transmitter that is arranged for transmitting ultrasound signals through said fluid in a transmitting phase, and at least another one of the at least two ultrasound transducer circuitry comprises an ultrasound receiver that is arranged for receiving transmitted ultrasound signals in a receiving phase. The system further comprises at least one receiving circuit that is arranged for reading out the ultrasound receiver in the receiving phase; and control means connected to the at least two ultrasound transducer circuitry and to the at least one receiving circuit. According to the invention, the flow measurement system comprises an ultrasound damping layer provided on the outer jacket of the flow tube, wherein the ultrasound damping layer is provided such that it substantially surrounds the outer jacket of the flow tube and is in contact with both the ultrasound transmitter and the ultrasound receiver. The speed of sound in the material of the flow tube substantially exceeds the speed of sound in the material of the ultrasound damping layer.

20 Claims, 2 Drawing Sheets

(56) References Cited

U.S. PATENT DOCUMENTS

| | | | | |
|---|---|---|---|---|
| 6,550,342 B2 * | 4/2003 | Croteau | ................. | G01D 5/268 |
| | | | | 73/800 |
| 6,626,049 B1 * | 9/2003 | Ao | ......................... | G01F 1/662 |
| | | | | 73/861.29 |
| 6,988,411 B2 * | 1/2006 | Gysling | ................... | G01H 5/00 |
| | | | | 73/579 |
| 7,096,719 B2 * | 8/2006 | Gysling | ................. | G01F 1/667 |
| | | | | 73/19.03 |
| 7,526,966 B2 * | 5/2009 | Gysling | ................. | G01F 1/667 |
| | | | | 73/861.23 |
| 7,975,559 B2 * | 7/2011 | Gysling | ................. | G01F 1/662 |
| | | | | 73/861.28 |
| 9,448,092 B1 * | 9/2016 | Hawwa | ................... | G01F 1/663 |
| 2010/0257941 A1 | 10/2010 | Gysling | | |

\* cited by examiner

ULTRASONIC FLOW METER

The invention relates to an ultrasonic flow measurement system comprising a flow tube for the fluid whose flow rate is to be determined; at least two ultrasound transducer circuitry, wherein at least one of the at least two ultrasound transducer circuitry comprises an ultrasound transmitter that is arranged for transmitting ultrasound signals through said fluid in a transmitting phase, and wherein at least another one of the at least two ultrasound transducer circuitry comprises an ultrasound receiver that is arranged for receiving transmitted ultrasound signals in a receiving phase.

In a prior art ultrasound flow meter, a flow tube is used having an ultrasound transmitter arranged at a side of the jacket of the flow tube, and arranged for transmitting an ultrasound wave at an angle relative to the longitudinal axis of the flow tube. A receiver is provided downstream and at an opposite side of the flow tube for receiving the ultrasonic waves. The time the ultrasonic waves require to propagate through the flow tube is used for determining the flow velocity in the flow tube. The time difference is determined inter alia by the diameter of the flow tube, the angle at which the ultrasonic waves propagate, and the flow velocity. When these flow meters are reduced in size, the time difference will become very small, viz. in the order of picoseconds ($10^{-12}$ s). In order to still be able to measure this time difference, very high frequencies are required, in the order of gigahertz (GHz). The fact that fluids often damp these high frequencies is disadvantageous.

From U.S. Pat. No. 6,055,868, a flow meter is known that comprises a flow tube on which two ring-shaped oscillators are provided. The oscillators are alternately energized to emit ultrasonic waves, which waves are detected by the other, non-energized oscillator. With this the time the ultrasonic waves require to propagate upstream and the time the new ultrasonic waves require for propagating downstream, as well as the time difference therebetween, is used for determining the flow velocity in the flow tube. A disadvantage of this known flow meter is that it is less suitable to be used for relatively small flows, since then the signal/noise ratio is not optimal.

It is therefore an object of the present invention to provide an improved ultrasonic flow sensor, which can also be used with relatively small flows.

In order to achieve that object, the invention provides an ultrasonic flow measurement system of the aforementioned kind, which comprises at least one receiving circuit that is arranged for reading out the ultrasound receiver in the receiving phase, and control means connected to the at least two ultrasound transducer circuitry and to the at least one receiving circuit. The ultrasound transducer circuitry are provided on the outer side of the flow tube. Thus, the interior volume of the flow tube is free from ultrasound transducer circuitry. According to the invention, an ultrasound damping layer is provided on the outer jacket of the flow tube, wherein the ultrasound damping layer is provided such that it substantially surrounds the outer jacket of the flow tube and is in contact with both the ultrasound transmitter and the ultrasound receiver. The material of the ultrasound damping layer and the flow tube are chosen and arranged in such a way that the speed of sound in the material of the flow tube substantially exceeds the speed of sound in the material of the ultrasound damping layer.

It has been found that according to the invention an improved signal/noise ratio is obtained at the location of the receiver. Without wishing to be theoretically bound by this, a possible explanation for this surprising effect will be given below merely by way of illustration.

The use of the transmitter in contact with the flow tube, for example in the form of a ring-shaped oscillator, causes the ultrasonic waves to propagate parallel to the longitudinal axis of the flow tube. The ultrasonic waves in that case propagate at least in part over the tube-fluid surface. The distance travelled by the waves between the transmitter and the receiver is thus independent of the diameter of the tube. This means that the flow meter can be designed to be relatively small-sized. By further designing the distance between the transmitter and the receiver to be sufficiently large, it becomes possible to obtain a measurable time for determining the flow rate.

In the flow tube according to the invention, mainly Scholte waves are generated. These Scholte waves are surface waves on the interface of a solid (the flow tube) and a fluid (the fluid to be measured, which may be a liquid or a gas). Said Scholte wave is influenced by the flow of the medium whose flow is to be determined. However, a portion of the ultrasonic waves being generated will not be a Scholte wave, but propagate entirely in the solid matter of the flow tube. This wave disturbs the desired signal at the location of the receiver. In addition, this wave propagates faster than the waves that do interact with the fluid.

By making use of the ultrasound damping layer in contact with the outer jacket of the flow tube and with the ultrasound transmitter and the ultrasound receiver, and ensuring that the ultrasound damping layer and the flow tube are designed and arranged such that the speed of sound in the material of the flow tube substantially exceeds the speed of sound in the material of the damping layer, that portion of the waves that do not interact with the fluid to be measured are influenced to such an extent that they cannot reach the ultrasound receiver, or reach it outside the time window that is used for the measurement. In that sense, the use of the ultrasound damping layer in contact with the outer jacket of the flow tube ensures that Stoneley waves are generated. These Stoneley waves are surface waves on the interface of a solid (the flow tube) and a solid (the ultrasound damping layer). Now that the speed of sound in the ultrasound damping layer is smaller than the speed of sound in the material of the flow tube, at least a portion of precisely those waves that do not interact with the fluid are thus influenced to such an extent that they arrive at the receiver at a later point in time, or even not at all, compared with the waves that do interact with the fluid. The result is, therefore, an improved signal/noise ratio, which is more representative of the flow.

It is thus apparent that an improved ultrasonic flow sensor has been obtained which, in addition, can also be designed to be relatively small-sized. The object of the present invention is thus achieved.

In an embodiment, at least the transmitter is a ring-shaped oscillator. In another embodiment the ultrasound transducers (transmitter(s) and/or receiver(s)) are ring-shaped oscillators. It is desired to be able to measure the flow in the entire flow tube. This means that the ultrasound wave (Scholte wave) generated by the ring-shaped oscillator, due to its ring shape, must be able to cover half of the diameter of the flow tube. The ultrasound wave is, however, also transmitted radially in the opposite direction, outwardly and away from the flow tube, and into the damping layer. As a rule of thumb, the wall thickness (or radial thickness) of the damping layer surrounding the ultrasound transducers is at least equal to the radius of the flow tube.

In an embodiment, the radial thickness of the ultrasound damping layer is larger than the outer radius of the flow tube, and in particular the radial thickness of the ultrasound damping layer exceeds the outer diameter of the flow tube.

In an embodiment, the radial thickness of the ultrasound damping layer is larger than the sum of the outer radius of the flow tube and the thickness of the ultrasound transmitter or receiver. In particular the wall thickness of the damping layer may be larger than the sum of the outer diameter of the flow tube and the thickness of the ultrasound transmitter or receiver.

In an embodiment the damping layer fully surrounds the flow tube in circumferential direction. In particular also the ultrasound transducers (transmitter and receiver) are surrounded by the damping layer, and the damping layer fully extends between the transmitter and the receiver.

The ultrasound transducer is preferably in acoustic contact with the outer jacket of the flow tube, for example in that it is directly connected thereto, or is provided thereon via an acoustically conductive (preferably thin) layer.

The damping layer preferably extends in the full circumferential direction of the flow tube. In this case, the flow tube and the ultrasound transducers are surrounded, as it were, by a second, larger tube that is made up of the material of the ultrasound damping layer. An inner side of this second, larger tube formed by the damping layer is in full contact with the part of the outer jacket of the flow tube extending between the outer most ultrasound transducers.

In an embodiment, the ultrasonic flow measurement system is designed based on the wave length of the Scholte wave. The Scholte waves are in an embodiment in the range of 1 to 20 mm, depending on the inner radius of the ultrasound transmitter. The distance between the ultrasound transmitter and the ultrasound receiver is typically in the range of 10 to 20 times the wave length of the Scholte wave, and hence the distance between the transmitter and the receiver is in the range of 10 mm to 400 mm. Additionally, the wall thickness of the flow tube may be in the range of 0.1 to 0.5 times the wave length of the Scholte wave. The wall thickness of the flow tube may thus be in the range of 0.1 to 10 mm. The above values result in a compact flow meter having a good signal/noise ratio.

Furthermore, the inner diameter of the flow meter may in an embodiment be in the range of 0.1 mm to 10 mm.

In an embodiment, the ratio of the transducer spacing, defined as the longitudinal distance between the ultrasound transmitter and the ultrasound receiver, to the inner diameter of the flow tube is in the range of 1:1 to 2000:1. More specifically, with the distance between the transmitter and the receiver being approximately 40 mm, and using an inner diameter within a range of 0.1 mm to 10 mm, the ratio becomes 400:1 and 4:1, respectively. With other dimensions for the distance between the transmitter and the receiver, another ratio is possible.

In use of the ultrasonic flow measurement system, the speed of sound in the material of the ultrasound damping layer substantially exceeds the speed of sound in the fluid whose flow rate is to be determined. At the same time, the speed of sound in the material of the ultrasound damping layer is substantially smaller than the speed of sound in the material of the flow tube. Due to this configuration an increased signal/noise ratio is obtained. It is believed that in the flow measurement system according to this embodiment, a combination of a Scholte wave and a Stoneley wave waves will be present in the flow measurement system: a first Scholte wave at the interface of the damping layer and the outer jacket of the flow tube, and a second Scholte wave at the interface of the inner jacket of the flow tube and the flow to be measured. Due to the characteristics of the damping layer, the resulting first Scholte wave is believed to be damped, in such a way that this Scholte wave does not, or to a lesser extent, reach the receiver. Hence, the signal received at the receiver is more representative for the second Scholte wave, and thus the signal is more representative for the flow to be measured. The signal to noise ratio is thus increased.

The speed of sound in the material of the flow tube is in an embodiment larger than 2000 m/s, in particular larger than 2500 m/s, more specifically in between 3000 m/s and 7000 m/s.

The speed of sound in the material of the ultrasound damping layer is in an embodiment larger than 1000 m/s, in particular larger than 1500 m/s, more specifically in between 2000 m/s and 3000 m/s.

In an embodiment, the flow measurement system is designed for measuring flows of fluids having a speed of sound that lies within the range of 1000 m/s and 2000 m/s. In that case, the speed of sound in the material of the ultrasound damping layer lies in between 2000 m/s and 3000 m/s, and the speed of sound in the material of the flow tube is larger than 3000 m/s. Preferably, the flow measurement system is designed such that the speed of sound of each of the damping layer, the flow tube and the flow to be measured, substantially differs from each other, for example by approximately 500 m/s or even 1000 m/s. For example, in case the system is designed for a fluid having a speed of sound of approximately 1800 m/s, the speed of sound of the damping layer may be approximately 2300 m/s, and the speed of sound of the material of the flow tube may be approximately 3300 m/s.

In an embodiment, the difference between the speed of sound in the flow tube and the speed of sound in the damping layer may be in the same order, or even be substantially the same as the difference between the speed of sound in the damping layer and the speed of sound in the flow to be measured. For example, in case the speed of sound in the flow tube is approximately 4500 m/s, the speed of sound in the damping layer may be designed to be approximately 3000 m/s, and then the flow measurement system is suitable to be used for media having a speed of sound in the range of 1000 m/s to 2000 m/s, more in particular a speed of sound of approximately 1500 m/s.

In an embodiment, each of the ultrasound transmitter and the ultrasound receiver is an ultrasound transducer that is arranged for transmitting ultrasound signals through said fluid in a respective transmitting phase thereof, and for receiving transmitted signals from another ultrasound transducer in a respective receiving phase thereof. With this it is possible to alternately energize the transducers to emit ultrasonic waves, which waves are detected by the other, non-energized oscillator. The time the ultrasonic waves require to propagate upstream and the time the new ultrasonic waves require for propagating downstream, as well as the time difference therebetween, is used for determining the flow velocity and/or mass flow in the flow tube. To this end, it is advantageous when the flow measurement system comprises multiplexer circuit arranged for selectively connecting said at least one receiving circuit to one of said at least two ultrasound transducers. In an embodiment, said at least two transducers are arranged to alternately transmit said ultrasound signals, and said multiplexer circuitry is arranged to alternately connect each of said at least one receiving circuits to one of said non-transmitting ultrasound transducers, respectively. Time delays, time errors and/or time offsets occurring in the at least one receiving circuit adversely affect the accuracy of the flow rate measurements.

These time delays, time errors and/or time offsets may be compensated, i.e. filtered out, in case the flow measurement system comprises a multiplexer circuit arranged for selectively connecting the at least one receiving circuit to one of said non-transmitting transducers.

In an embodiment, the damping layer comprises epoxy or a composite thereof. The ultrasound damping layer may be made of a cured epoxy resin, in particular chosen from the group consisting of Bisphenol A epoxy resin, Bisphenol F epoxy resin, Novolac epoxy resin, Aliphatic epoxy resin, and Glycidylamine epoxy resin. The epoxy resin may be cured by means of homopolymerisation, or by means of an epoxy hardener chosen from the group consisting of amines, anhydrides, phenols, and thiols. In an embodiment, the damping layer may be epoxy or a composite thereof, and the flow tube may comprise a material other than (stainless) steel, Teflon, PEEK, glass, or ceramic. In an alternative embodiment, the damping layer may be any material but epoxy or a composite thereof.

A suitable material for the flow tube may be a metal, such as a (stainless) steel tube. Other materials for the flow tube are also conceivable, such as hastelloy, or a non-metal, such as teflon, PEEK, glass or a ceramic material. In an embodiment, the flow tube is a metal, such as a (stainless) steel tube, hastelloy, or a non-metal, such as teflon, PEEK, glass or a ceramic material, and the damping material is a material free from epoxy or a composite thereof.

In an embodiment, the damping layer is designed such that, in use, the speed of sound in the material of the damping layer substantially exceeds the speed of sound in the fluid whose flow rate is to be determined.

In a relatively simple embodiment, which is also relatively easy to produce, the ultrasound transducer comprises a piezo element. Said piezo element may comprise a relatively thin piezo film. A polyvinylidene fluoride or polyvinylidene difluoride (PVDF) material may alternatively be used. PVDF has a very strong piezoelectric effect, and PVDF is in particular suitable for generating a voltage when the material is set vibrating. Furthermore, it is conceivable to use a PZT element, a ceramic crystal that can function as a transmitter and/or receiver.

In an embodiment of the invention, the assembly of the flow tube, the ultrasound transmitter and the ultrasound receiver, and at least part of the ultrasound transducer circuitry is completely moulded in the epoxy or the epoxy composite as described above. This way an improved ultrasonic flow meter can be provided in a relatively easy and cost-effective way. The above described assembly may be inserted into a hollow tube-mould, after which the uncured epoxy or epoxy composite may be poured in between the assembly and the inner jacket of the tube-mould. After curing, the tube-mould may be removed.

In one embodiment, the ultrasound transducers (ultrasound transmitter and receiver) are provided at least substantially entirely around the flow tube. In this way a substantially rotation-symmetrical signal is obtained, and essentially an average of the flow will be determined if the flow should not be entirely uniform.

In an embodiment, the flow tube is a straight tube in order to effect a substantially uniform flow in the flow tube.

According to an aspect, the invention provides a method of manufacturing an ultrasonic flow measurement system according to the invention. The method comprises the steps of providing an assembly of the flow tube, the ultrasound transducer circuitry, the ultrasound transmitter and the ultrasound receiver, as described above. The method further comprises the step of providing an ultrasound damping layer, wherein the material properties of the ultrasound damping layer are such that the speed of sound in the material of the flow tube substantially exceeds the speed of sound in the material of the ultrasound damping layer. According to the method, said ultrasound damping layer material is provided on the outer jacket of the flow tube in such a way that it substantially surrounds the outer jacket of the flow tube and is in contact with both the ultrasound transmitter and the ultrasound receiver and at least part of the ultrasound transducer circuitry. In this way, the flow measurement system according to the invention can be made in a relatively quick and easy manner.

In an embodiment, the method comprises the step of providing an epoxy resin as the ultrasound damping layer, in particular chosen from the group consisting of Bisphenol A epoxy resin, Bisphenol F epoxy resin, Novolac epoxy resin, Aliphatic epoxy resin, and Glycidylamine epoxy resin, and wherein the method comprises the step of curing said epoxy resin.

The epoxy resin may be cured by means of thermal curing.

The epoxy resin may be cured by means of homopolymerisation, or by means of an epoxy hardener chosen from the group consisting of amines, anhydrides, phenols, and thiols.

In an embodiment, the assembly of the flow tube, the ultrasound transducer circuitry, the ultrasound transmitter and the ultrasound receiver, is positioned into a mould, and subsequently a damping layer material in liquid form is provided in the mould. For instance, a hollow tube-mould may be provided as a mould, the assembly may be positioned therein, and outer ends of the tube may be sealed. After that, non-cured epoxy resin is poured into the mould, such that it comes into contact with the assembly and the inner jacket of the mould. Thermal curing may be used for curing the epoxy resin. Finally, the mould may be removed to obtain the flow measurement system according to the invention. The above method is relatively quick, easy, and cost-effective.

The invention will now be explained in more detail by means of a description of a few possible embodiments as shown in the appended figures. In the figures.

Figure 1:
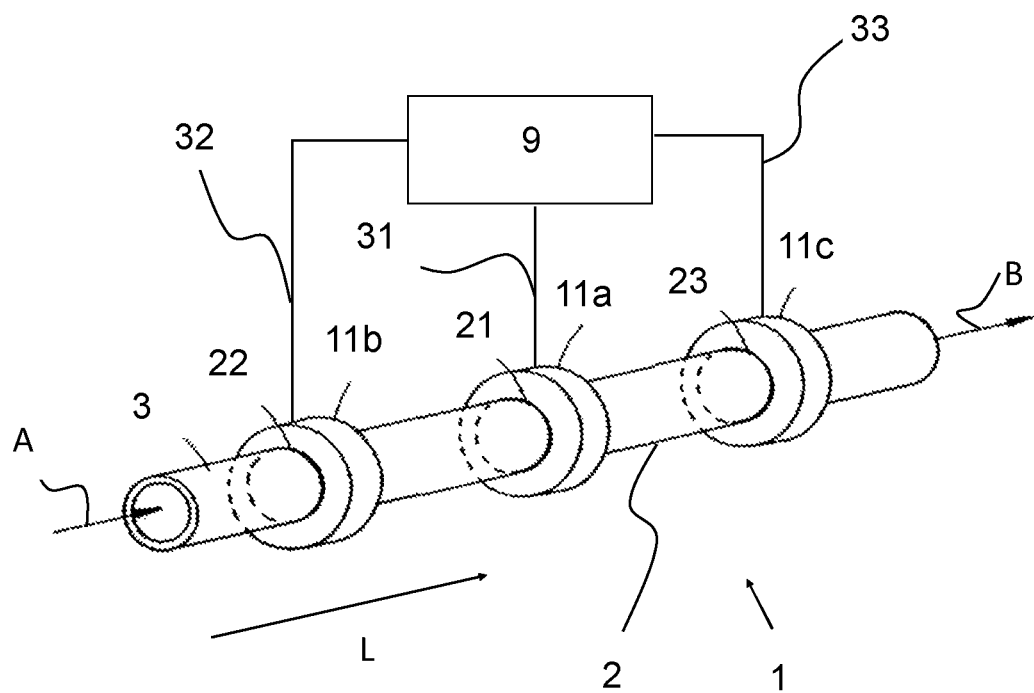
FIG. 1 is a perspective view of a first embodiment of the flow meter according to the present invention.

FIG. 1 shows part of a flow measurement system 1 according to the present invention in perspective view. The flow measurement system 1 comprises a flow tube 2 for the medium whose flow is to be measured. The flow tube has an outer jacket 3. The flow tube 2 is provided with an inlet A and an outlet B. The flow tube is preferably an elongate, straight tube 2, which extends in a longitudinal direction L.

On the outer side of the flow tube a first oscillator 11a is provided on the outer jacket 3 of the flow tube 2. The first oscillator 11a is ring-shaped in the illustrated embodiment, and is provided entirely around the circumference of the tube 2. The first oscillator 11a is in acoustic contact with the outer jacket 3 of the flow tube via an acoustically conductive layer 21, which may be provided by a curable resin that is used to attach the oscillator 11a to the jacket 3. Provided at a position longitudinally spaced from the first oscillator 11a, and provided upstream thereof, is a second oscillator 11b, which is likewise in contact with the outer jacket 3 of the flow tube 2, in this case via an acoustically conductive layer 22. Provided at a position longitudinally spaced from the first oscillator 11a, and provided downstream, is a third oscillator 11c, which is likewise in contact with the outer jacket 3 of the flow tube 2, in this case via an acoustically conductive layer 23.

Each oscillator 11a-11c is part of a respective ultrasound circuitry 31, 32, 33, which may be ultrasound transducer circuitry or receiving circuitry, as will be explained below. In the illustrated embodiment, the ultrasound circuitry 31, 32, 33 are connected to control means 9 for controlling the flow measurement system 1, in particular the ultrasound transducers (transmitter and/or receiver).

In an embodiment, the first oscillator 11a is an ultrasound transmitter that is arranged for transmitting ultrasound signals, and the second 11b and third 11c oscillators are ultrasound receivers arranged for receiving ultrasound signals.

The first oscillator 11a and/or the second 11b and third 11c oscillator may be configured as piezo elements. The piezo element may in that case comprise a piezo film. It is further conceivable that the receiving element is a PZT element, comprises a PVDF material or is a ceramic crystal.

The illustrated configuration of the ring-shaped oscillator 11a provided around the flow tube 2, which functions as a transmitting element, is supposed to generate so-called Scholte waves in the flow tube 2. A surface wave occurs at the interface of a solid material (the inner jacket of the flow tube 2) and the fluid whose flow rate is to be determined. Said Scholte wave is influenced by the flow of the medium whose flow rate is to be determined. A portion of the ultrasonic waves being generated will not be Scholte waves, however, but propagate entirely in the solid material of the flow tube 2, for example in the part near the outer jacket 3 of the flow tube 2. This wave does not contain any information on the flow whose flow rate is to be determined, and actually disturbs the signal being measured.

Figure 2:
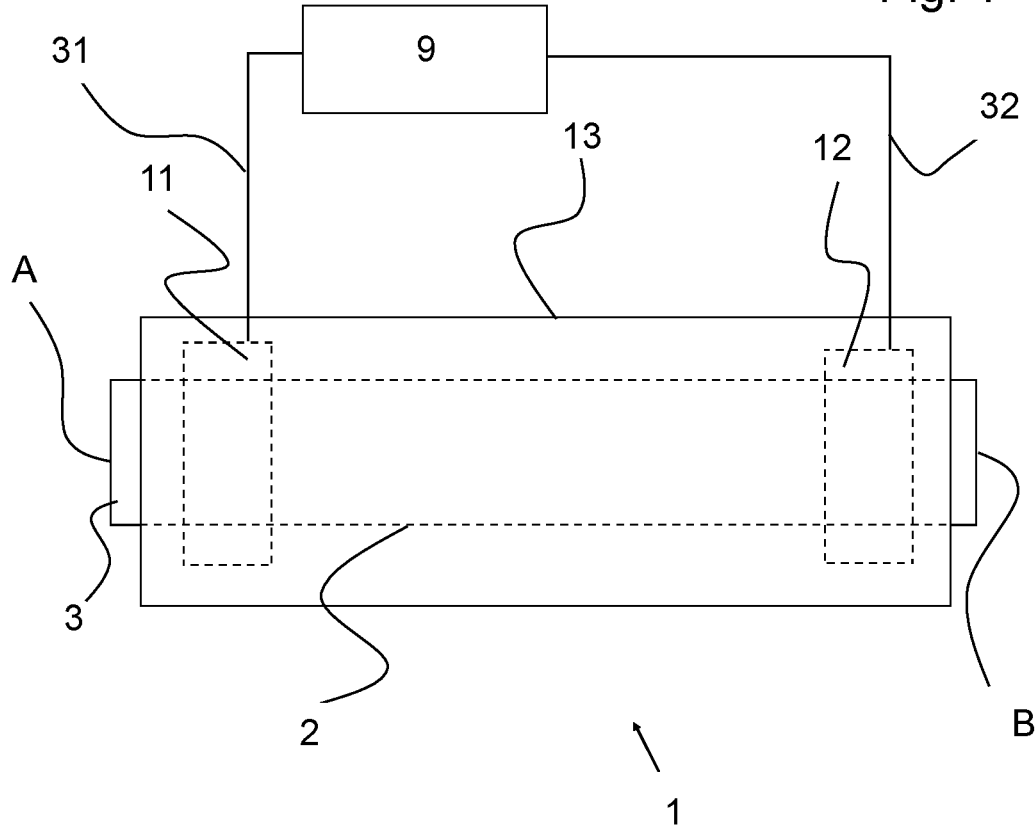
FIG. 2 is a schematic side view of a second embodiment of the flow meter according to the present invention.
Figure 3:
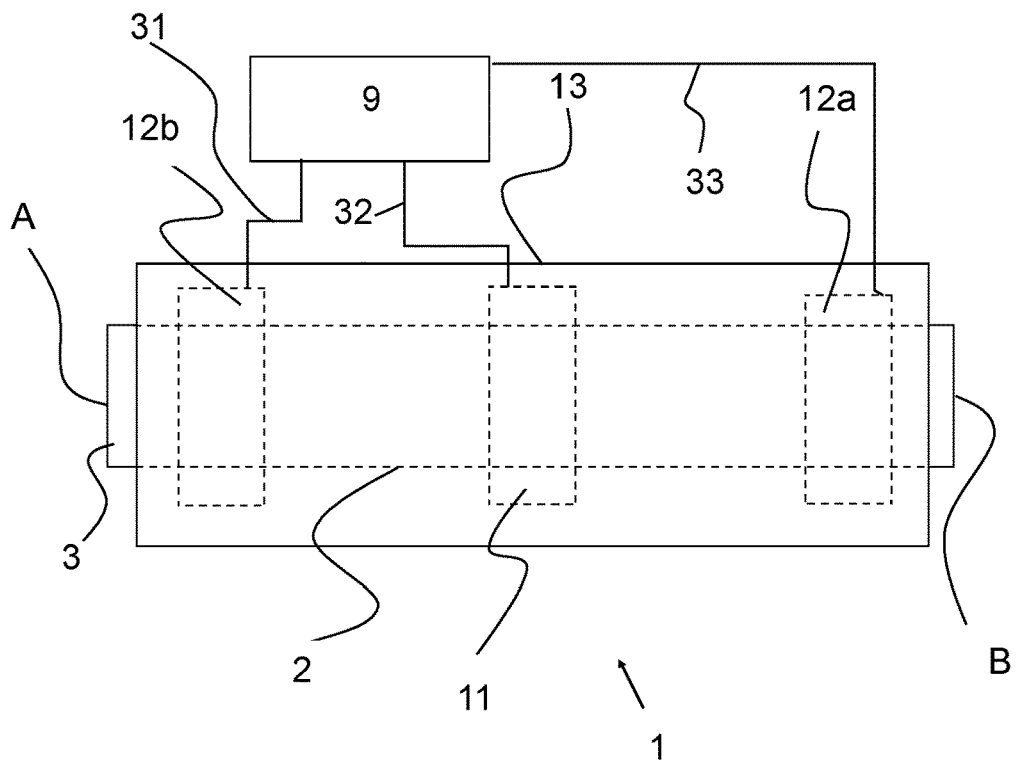
FIG. 3 is a schematic side view of a third embodiment of the flow meter according to the present invention.
Figure 4:
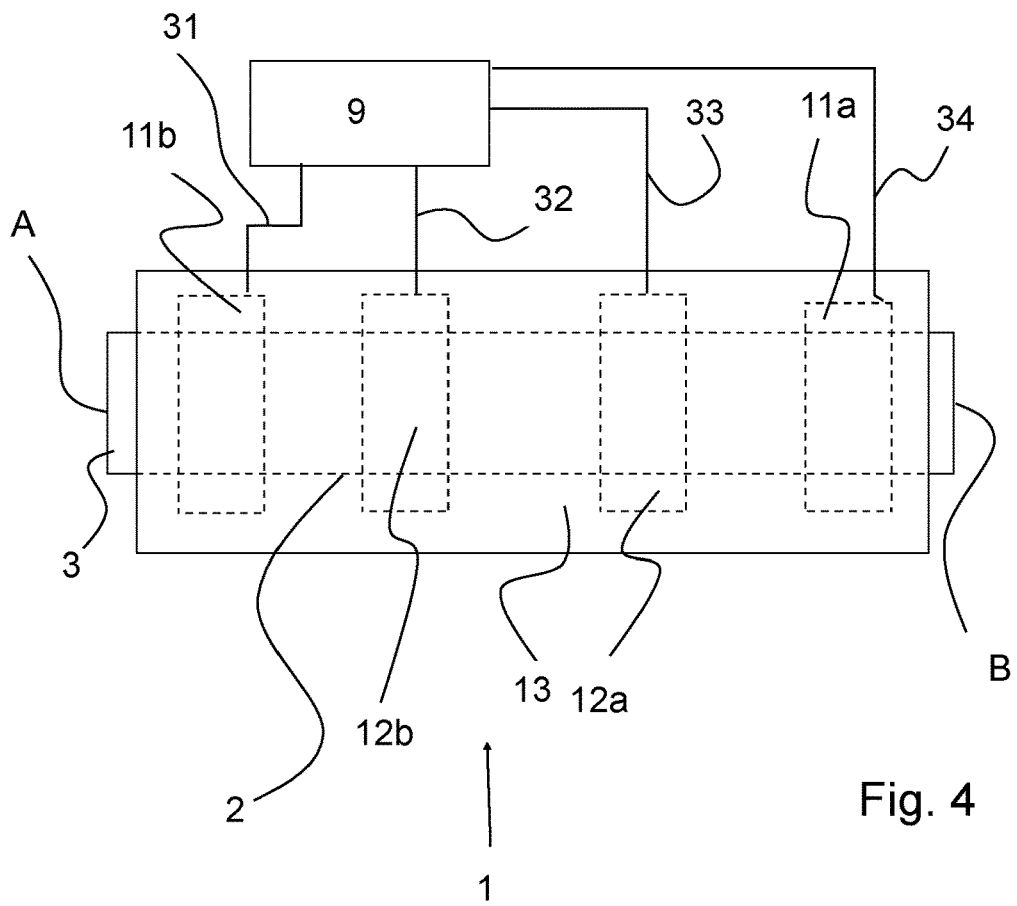
FIG. 4 is a schematic side view of a fourth embodiment of the flow meter according to the present invention.

To prevent this disturbance, the flow measurement system 1 according to the present invention is provided with an ultrasound damping layer 13, which for clarity purposes is not shown in FIG. 1 but is visible in the embodiments shown in FIGS. 2 to 4. The ultrasound damping layer 13 is provided on the outer jacket 3 of the flow tube 2, and is provided such that it substantially surrounds the outer jacket 3 of the flow tube and is in contact with the ultrasound transducers 11a-11c, and with at least part of the ultrasound circuitry 31, 32, 33. The material of the flow tube 2 and the material of the ultrasound damping layer 13 are chosen such that the speed of sound in the material of the flow tube 2 substantially exceeds the speed of sound in the material of the ultrasound damping layer 13. The ultrasound damping layer 13 causes the emitted ultrasonic waves propagating in the outer jacket 3 to be influenced to such an extent that said waves are unable to reach the receiver or do not reach the receiver until after the time window that is used for the measurement. The result is, therefore, that it is possible to realise an improved signal/noise ratio, which is more representative of the flow.

The material layer 13 may be an epoxy layer, which is supposed to absorb the portion of the ultrasonic waves, or at least influence it (change its direction) to such an extent that the waves do not arrive at the receiving element 12, or much sooner or not until much later than the Scholte waves.

FIG. 2 shows a preferred embodiment, which is relatively easy to manufacture, in which only two ultrasound transducers are used, i.e. a ring-shaped transmitting element 11 and a ring-shaped receiving element 12. Said transmitting and receiving elements are in acoustic contact with the outer jacket 3 of the flow tube 2. The influencing element 13 is provided in such a manner that it fully surrounds the assembly of the flow tube and any ultrasound transducer, in this case the transmitting element 11, the receiving element 12 and at least part of the ultrasound transducer circuitry 31, 32. In a special embodiment this is possible by moulding the assembly in a material layer suitable for that purpose, which is designed to influence the portion of the ultrasonic waves in such a manner that said waves reach the receiving element outside the relevant time window. A suitable material is epoxy, for example, or a composite thereof. A suitable material for the flow tube may be a metal, such as a (stainless) steel tube. As already said before, also other materials are conceivable, such as hastelloy, or a non-metal, such as teflon, PEEK, glass or a ceramic material.

FIG. 3 shows another embodiment that is preferred. FIG. 3 shows a sensor device 1 comprising a control unit 9 connected to ultrasound transducer circuitry 31, 32, 33 having ultrasound transducers in the form of a ring-shaped transmitting element 11, and two ring-shaped receiving elements 12a, 12b disposed upstream and downstream thereof, respectively. The transmitting element 11 and the receiving elements 12a, 12b are in acoustic contact with the outer jacket 3 of the flow tube. The damping layer 13 surrounds the assembly of the tube 2 and the ultrasound transducers, i.e. the transmitting and receiving elements 11, 12a, 12b, including at least part of the ultrasound transducer circuitry 31, 32, as already described above with reference to FIG. 2. Using such an embodiment, precise measurements can be realised.

It is furthermore advantageous, when each of the ultrasound transmitter 11 and the ultrasound receivers 12a, 12b are ultrasound transducers that are arranged for transmitting ultrasound signals through said fluid in a respective transmitting phase thereof, and for receiving transmitted signals from another ultrasound transducer in a respective receiving phase thereof. The control means 9 may be used to cycle each one of the ultrasound transducers into a transmitting phase and a receiving phase. In this sense, one of the ultrasound transducers 11, 12a, 12b, acts as a transmitter, and the other two transducers act as receivers. Then, another one is selected to be the transmitter, and the remaining two transducers are set to be receivers. As a result, measurements can be carried out in different ways, resulting in a higher degree of precision.

FIG. 4 shows another embodiment, comprising a sensor device 1 with a control unit 9 connected to a total of four ultrasound transducer circuitry 31, 32, 33, 34 comprising two spaced-apart ring-shaped transmitting elements 11a, 11b and, disposed therebetween, two spaced-apart receiving elements 12a, 12b. The damping layer 13 surrounds the assembly of the tube and the transmitting and receiving elements 11a, 11b, 12a, 12b, including at least part of the ultrasound transducer circuitry. In such an embodiment, individual upstream and downstream measurements are possible, so that different measurements can be combined. It is also conceivable in that regard for the transmitting and receiving elements to be exchanged in advance, so that the receiving elements will be located furthest upstream and downstream, respectively. Such an exchange can also take place in a controlled manner, as already indicated in FIG. 3, using control unit 9, for example, so that a switchover of transmitter and receiver is possible during use. As a result, measurements can be carried out in different ways, resulting in a higher degree of precision.

The measurements are carried out in order to obtain two parameters. The first parameter is the time difference between the upstream measurement and the downstream measurement, and the second parameter is the propagation rate of the ultrasonic wave. It is noted, moreover, that it is not the sound velocity in the liquid that is measured here. The propagation rate being measured is related to the fluid velocity.

The upstream measurement and the downstream measurement may furthermore be correlated with each other, and from the result thereof the time difference can be determined, on the basis of which a measure of the flow can be further determined. Such a correlation between wave fronts is known per se to the skilled person in the field of general signal processing.

The skilled person will appreciate that the invention has been explained in the foregoing with reference to preferred embodiments of the invention. The invention is not limited to these embodiments, however.

Thus it is conceivable, for example, that additional transmitting and/or receiving elements are provided. Thus it is conceivable to use an embodiment comprising two longitudinally spaced transmitting elements, with a receiving element disposed therebetween. Furthermore it is conceivable to use an embodiment comprising two longitudinally spaced receiving elements, with the transmitting element disposed therebetween. The use of additional ultrasound circuitry, including transmitters and/or receivers is also conceivable, of course, in which case the damping layer preferably surrounds the additional transmitters and/or receivers.

Accordingly, various modifications are conceivable within the framework of the invention. The scope of the protection sought is determined by the appended claims.

The invention claimed is:

1. An ultrasonic flow measurement system comprising:
a flow tube for the fluid whose flow rate is to be determined;
at least two ultrasound transducer circuitry provided on the outer side of the flow tube, wherein at least one of the at least two ultrasound transducer circuitry comprises an ultrasound transmitter that is arranged for transmitting ultrasound signals through said fluid in a transmitting phase, and wherein at least another one of the at least two ultrasound transducer circuitry comprises an ultrasound receiver that is arranged for receiving transmitted ultrasound signals in a receiving phase;
at least one receiving circuit that is arranged for reading out the ultrasound receiver in the receiving phase; and
control means connected to the at least two ultrasound transducer circuitry and to the at least one receiving circuit;
wherein the flow measurement system comprises an ultrasound damping layer provided on the outer jacket of the flow tube, wherein the ultrasound damping layer is provided such that it substantially surrounds the outer jacket of the flow tube in a circumferential direction and is in contact with both the ultrasound transmitter and the ultrasound receiver; and
wherein the speed of sound in the material of the flow tube substantially exceeds the speed of sound in the material of the ultrasound damping layer.

2. The ultrasonic flow measurement system according to claim 1, wherein at least the ultrasound transmitter comprises a ring-shaped oscillator provided in acoustic contact with the outer jacket of the flow tube.

3. The ultrasonic flow measurement system according to claim 1, wherein, in use of the ultrasonic flow measurement system, the speed of sound in the material of the ultrasound damping layer substantially exceeds the speed of sound in the fluid whose flow rate is to be determined.

4. The ultrasonic flow measurement system according to claim 1, wherein the ratio of the transducer spacing, defined as the longitudinal distance between the ultrasound transmitter and the ultrasound receiver, to the outer diameter of the flow tube is in the range of 1:1 to 2000:1, more in particular in the range of 4:1 to 400:1.

5. The ultrasonic flow measurement system according to claim 1, wherein each of the ultrasound transmitter and the ultrasound receiver is an ultrasound transducer that is arranged for transmitting ultrasound signals through said fluid in a respective transmitting phase thereof, and for receiving transmitted signals from another ultrasound transducer in a respective receiving phase thereof.

6. The ultrasonic flow measurement system according to claim 1, wherein the speed of sound in the material of the flow tube is larger than 2000 m/s.

7. The ultrasonic flow measurement system according to claim 1, wherein the speed of sound in the material of the ultrasound damping layer is larger than 1000 m/s.

8. The ultrasonic flow measurement system according to claim 1, wherein the radial thickness of the ultrasound damping layer is larger than the outer radius of the flow tube.

9. The ultrasonic flow measurement system according to claim 8, wherein the radial thickness of the damping layer exceeds the outer diameter of the flow tube.

10. The ultrasonic flow measurement system according to claim 8, wherein the radial thickness of the ultrasound damping layer is larger than the sum of the outer radius of the flow tube and the radial thickness of the ultrasound transmitter or receiver.

11. The ultrasonic flow measurement system according to claim 8, wherein the wall thickness of the damping layer is larger than the sum of the outer diameter of the flow tube and the thickness of the ultrasound transmitter or receiver.

12. The ultrasonic flow measurement system according to claim 1, wherein the ultrasound damping layer is made of a cured epoxy resin.

13. The ultrasonic flow measurement system according to claim 12, wherein the cured epoxy resin is chosen from the group consisting of Bisphenol A epoxy resin, Bisphenol F epoxy resin, Novolac epoxy resin, Aliphatic epoxy resin, and Glycidylamine epoxy resin.

14. The ultrasonic flow measurement system according to claim 12, wherein the epoxy resin is cured by means of homopolymerisation, or by means of an epoxy hardener chosen from the group consisting of amines, anhydrides, phenols, and thiols.

15. The ultrasonic flow measurement system according to claim 12, wherein the assembly of the flow tube, the ultrasound transmitter and the ultrasound receiver, and at least part of the ultrasound transducer circuitry is completely moulded in the epoxy or the epoxy composite.

16. A method of manufacturing an ultrasonic flow measurement system according to claim 1, comprising the steps of providing an assembly of the flow tube, the ultrasound transducer circuitry, the ultrasound transmitter and the ultrasound receiver, wherein the method comprises the step of providing an ultrasound damping layer in such a way that the speed of sound in the material of the flow tube substantially exceeds the speed of sound in the material of the ultrasound damping layer, and providing said ultrasound damping layer on the outer jacket of the flow tube in such a way that it substantially surrounds the outer jacket of the flow tube and is in contact with both the ultrasound transmitter and the ultrasound receiver and at least part of the ultrasound transducer circuitry.

17. The method according to claim 16, wherein the method comprises the step of providing an epoxy resin as the ultrasound damping layer.

18. The method according to claim 17, wherein the epoxy resin is chosen from the group consisting of Bisphenol A epoxy resin, Bisphenol F epoxy resin, Novolac epoxy resin, Aliphatic epoxy resin, and Glycidylamine epoxy resin, and wherein the method comprises the step of curing said epoxy resin.

19. The method according to claim 17, wherein the epoxy resin is cured by means of thermal curing.

20. The method according to claim 17, wherein the epoxy resin is cured by means of homopolymerisation, or by means of an epoxy hardener chosen from the group consisting of amines, anhydrides, phenols, and thiols.

* * * * *